United States Patent [19]

Loria et al.

[11] Patent Number: 5,443,628
[45] Date of Patent: Aug. 22, 1995

[54] HIGH TEMPERATURE JET PRINTING INK

[75] Inventors: Adrian M. Loria, Wilmette; Lily Tai, Chicago, both of Ill.

[73] Assignee: Videojet Systems International, Inc., Wood Dale, Ill.

[21] Appl. No.: 287,269

[22] Filed: Aug. 8, 1994

[51] Int. Cl.6 .............................. C09D 11/02
[52] U.S. Cl. ...................... 106/20 C; 106/20 D
[58] Field of Search ............ 106/20 C, 23 C, 20 D

[56] References Cited

U.S. PATENT DOCUMENTS

| | | | |
|---|---|---|---|
| 4,365,035 | 12/1982 | Zabiak | 106/23 C |
| 4,404,254 | 9/1983 | Franz et al. | 428/329 |
| 4,680,058 | 7/1987 | Shimizu et al. | 106/400 |
| 4,919,727 | 4/1990 | Burow et al. | 106/456 |
| 5,085,706 | 2/1992 | Kuske et al. | 106/456 |
| 5,273,575 | 12/1993 | de Saint Romain | 106/23 B |

FOREIGN PATENT DOCUMENTS

| | | |
|---|---|---|
| 89121806 | 11/1989 | European Pat. Off. . |
| 93401336 | 5/1993 | European Pat. Off. . |
| 61-92213 | 4/1986 | Japan . |
| PCTGB9200-342 | 9/1992 | WIPO . |

Primary Examiner—Helene Klemanski
Attorney, Agent, or Firm—Leydig, Voit & Mayer, Ltd.

[57] ABSTRACT

A method and composition for printing images onto substrates that are to be subsequently subjected to temperatures of at least 500° F., comprising printing onto said substrate, by ink jet printing, an ink composition comprising a dispersion of synthetic pigment particles that have a particle size from about 0.02 to about 0.20 microns, with at least about 90 percent of said particles having diameters less than about 0.1 micron, and subsequently subjecting said substrate to said temperature.

8 Claims, No Drawings 5,443,628

HIGH TEMPERATURE JET PRINTING INK

This invention relates to ink jet formulations in general and in particular to formulations that are useful in the ink jet printing of substrates that are to be subjected to high temperatures after being so printed, such as ceramic articles and those made of glass.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is particularly well suited for application of characters onto irregularly shaped surfaces, including, for example, the bottom of beverage containers.

In general, an ink jet composition must meet certain rigid requirements to be useful in ink jet printing operations. These relate to viscosity, resistivity, solubility, compatibility of components and wetability of the substrate. Further, the ink must be quick-drying and smear resistant, must be capable of passing through the ink jet nozzle without clogging, and must permit rapid cleanup of the machine components with minimum effort.

However, despite the many advantages of ink jet printing, it has not, to date, been commercially used to print images on ceramics, glass or other substrates that are subjected high temperatures after being so printed. Several patents and publications have, however, made reference to ink jet compositions for such use. U.S. Pat. No. 5,273,575, for example, relates to ink jet formulations for printing onto ceramics, wherein the formulation comprises a metallic salt that is colorless, in combination with a coloring agent. After printing on the substrate and subsequent heat-curing, the metallic salt is converted to a colored oxide. The salts that are used are soluble in the carrier that is employed.

In accordance with PCT publication PCT/GB92/00342, ink jet formulations are disclosed for printing on substrates such as ceramics and glass that are to be heated after printing. The ink compositions of that disclosure comprise pigment dispersions wherein the median size of the pigment particles is from 0.2 to 2 microns, with less than 20 percent of the particles being less than 0.2 microns in size. A significant problem with such formulations, however, is the instability of the formulations, due to settling upon storage. After settling, redispersion of such pigment particles is very difficult, if not impossible.

SUMMARY OF THE INVENTION

The present invention provides a ink jet compositions that are capable of being printed onto substrates that are intended to be heated to high temperatures, such as at least about 500° F., or higher, with the printed images remaining readable after such heating. The ink jet compositions comprise a dispersion of synthetic pigment particles that have a particle size from about 0.02 to about 0.20 microns, with at least about 90 percent of said particles having diameters less than about 0.1 micron, preferably less than about 0.05 micron. The ink jet formulation also comprises a carrier and a binder.

The present invention also comprises a method of forming images on a substrate which images are capable of withstanding heating to high temperatures, thus providing legible images after such heating.

DETAILED DESCRIPTION OF THE PREFERRED EMBODIMENTS

As described hereinabove, the ink compositions of the present invention comprise the pigment particles, a carrier and a binder. Other optional components may be present in carefully balanced proportions to achieve preferred operation of the ink in an ink jet printing apparatus.

In one embodiment, the present invention provides an ink composition suitable for ink jet printing of printed images, wherein the carrier is water, or a mixture of water and a miscible cosolvent. Such ink jet formulations are useful for printing onto porous substrates. In another embodiment, the present invention provides an ink composition suitable for printing onto nonporous substrates, wherein the carrier is an organic solvent.

In general, the ink compositions of the present invention exhibit the following characteristics for use in ink jet printing systems: (1) a viscosity from about 1 to about 10 centipoises (cps) at 25° C., (2) an electrical resistivity from about 40 to about 2,000 ohms-cm$^{-1}$, (3) a sonic velocity from about 1,200 to about 1,700 m/sec., and (4) a surface tension below 70 dynes/cm.

PIGMENTS

The pigments of use in the present invention are those having particles within the size range from about 0.02 to about 0.20 microns, with at least about 90 percent of said particles having diameters less than about 0.1 micron, preferably less than about 0.05 micron. Preferably, the median particle size is from about 0.01 to about 0.10 micron. The pigment particles are, therefore, substantially free of pigment particles that are larger than about 0.1 micron, and by that it is meant that no more than 90 percent, and preferably no more than 98 percent, of the pigment particles will be larger than 0.1 micron. For purposes of determining median particle size and absolute particle size, the following technique should be employed.

The particle size analysis of the pigment is performed using a photosedimentometer developed by Joyce-Loebl Co.

The instrument uses a centrifugal method of analysis. The test specimen is injected into a rotating disc centrifuge. As the pigment particles start to move due the centrifugal force, a light beam fixed at a point in the instrument, senses the particle migration and electronically records the centrifuge time. The bigger the particle size, the lower the centrifuge time will be required, the smaller particle will have longer centrifuge times. Based on this principle a computerized data and graph analysis of the particles are obtained.

The preferred pigments for use in the present invention are those that are synthetic, as opposed to natural, in origin. Synthetic pigments are characterized, in part, by the fact that they are substantially free of heavy metals. The crystal structure of synthetic pigments is also more uniform and closer to a perfect crystal structure than found in pigments that are natural in origin. Crystalline quartz that is often found in natural pigments is not present in synthetic pigments, such as those made of iron oxide.

Synthetic pigments may be made of any of a number of different techniques, including, but not limited to those described in U.S. Pat. Nos. 4,404,254; 4,919,727; and 5,085,706, the disclosures of which are incorporated herein by reference.

The small size of the pigment particles is required to obtain an ink jet formulation that is stable and printable. The small particle size can be achieved through any of a number of different techniques for reduction of particle size, such as milling, grinding and micronization, in combination, when necessary, with a classification or separation method based on size, such as centrifugation, screening, or the like.

It is particularly important to have pigment particles that have the desired median particle size, but also that the formulations be substantially free, as indicated above, of particles that are larger than 0.2 micron.

FORMULATION CONSIDERATIONS

As indicated, both aqueous and solvent based inks are within the scope of the present invention.

The amount of pigment used in any particular ink formulation will be based upon many different factors, such as the size and shape of the pigment particles, as well as the nature of the particular formulations, which may be varied. Among other considerations, the amount of pigment loading that can be employed will be higher for those formulations that have a higher viscosity, as a general proposition, the higher the viscosity, the greater the pigment loading that can be employed without undue settling.

In aqueous formulations, the high density carrier (water) and high viscosity of the vehicle can take higher pigment loading without undue settling of the particles. Typical pigment loadings in aqueous formulations will be from about 3 to about 12 percent.

In solvent based formulations, the low density carrier (ketone or alcohol) and low viscosity vehicle cannot take higher pigment loading. Typical pigment loadings in solvent based formulations will be from about 3 to about 8 percent.

SEDIMENTATION

The ink formulations should be stable in dispersion. Dispersion properties should remain constant at temperatures up to about 110° F., and the dispersion should not show any signs of sedimentation for at least 18 months. There should additionally be no agglomeration of pigment particles in the dispersion.

The sedimentation rate of the pigment is performed by a DYNOMETER from BYK-Chemie which uses a catcher pan immersed in a 100 milliliter of the test fluid. The settling of the particles are collected and the pan are electronically registered and plotted on a graph paper as a function of weight and time.

PROPERTIES AND ADVANTAGES

The aqueous based formulations of the present invention are especially useful for printing onto ceramic substrates. Such substrates, after printing, may be cured at elevated temperatures, such as up to 1,500° F. up to even 2,000° F., or more. Accordingly, the inks of the present invention are capable of forming printed images that can be heated to such temperatures and will still be legible.

The solvent based inks of the present invention are especially useful for printing onto smooth surfaces, such as glass, and, therefore, find particular utility for printing onto light bulbs. Inks for such use must also be capable of withstanding high temperatures, such as up to 500° to 600° F. Accordingly, the solvent based inks of the present invention are capable of forming printed images that can be heated to such temperatures and still remain legible.

THE CARRIER

Water is used as the carrier for the ink compositions of the present invention when the formulation is to be used for printing onto ceramics. Deionized water is preferred, for reasons of purity and to minimize interference of foreign ions during the printing process. Typically, water is present in an amount from about 70% to about 90% by weight of the ink composition, and is preferably present in an amount from about 74% to about 84%. Cosolvents may also be present, such as short-chain alcohols, including methanol, ethanol and isopropanol.

When the ink jet formulation is to be used for printing onto nonporous substrates, such as glass, an organic solvent is employed. Useful solvents for the present formulations include ketones, alcohols and esters.

BINDER

Any film-forming resins may be used to add adhesion of the ink droplet to the substrate and to provide a measure of protection to the dried droplet against abrasion and the action of water or other solvents contacting the dried droplet. Typically, such resins will be organic resins as commonly used in ink jet printer ink compositions, and include, for example, acrylic copolymers, silicone resins, rosin esters, polyvinyl esters, ketone resins, urea aldehyde resins, vinyl chloride/vinyl ether or vinyl acetate copolymers, polyamide resins, styrene/maleate resins, polyvinylpyrrolidone resins, vinyl pyrrolidone/vinyl acetate copolymers, polystyrene resins, melamine resins, thermosetting acrylic resins, polyurethane resins and radiation curable acrylate resins. Such resins can be used in their commercially available forms.

DISPERSANT

It may also be useful to use a dispersing agent to keep the pigment particles dispersed. Useful dispersants include Surfynol 104 and Nopcosphere 44.

THE HUMECTANT

A humectant may be used to prevent the ink jet tip from drying, and the nozzle/valve from clogging. It can also act as a viscosity control agent. Different molecular weights of polyethylene glycols have different solution viscosities. Ink viscosity can be tailor-made by making use of this property. Humectants useful in the ink compositions of the present invention include glycerol, propylene glycol and polyethylene glycols, such as Carbowax 200, Carbowax 300, Carbowax 400, Carbowax 600, and Carbowax 3350, all available from Union Carbide. Propylene glycol is preferred.

The humectant should be present in an amount from about 2% to about 4% by weight of the ink composition, with an amount of from about 4 to about 8 being preferred.

OPTIONAL COMPONENTS

Other components may also be included in the ink compositions of the present invention to impart characteristics desirable for ink jet printing applications.

Resins may also be added to boost the viscosity of the ink compositions. Useful resins include polyester emulsions, acrylic emulsions, acrylic resins, polyvinyl alcohol, cellulose acetate resin, polyvinyl pyrrolidone, styrenated shellac emulsions, and acrylated shellac emulsions. Preferred resins are available as Airvol 205 S from Air Products or the Joncryls from Johnson Wax. The resin, if used, should be present in an amount from about 0.2% to about 5% by weight of the ink composition. The preferred amount of resin, if resin is used, if from about 0.5% to 4.5% by weight of the composition.

The compositions of the present invention may also contain conductivity agents. If present, they are present in amounts of from about 0.2% to about 2.0%. Examples of suitable conductivity agents include dimethylamine hydrochloride, diethylamine hydrochloride, lithium nitrate, and hydroxylamine hydrochloride. It is preferable to use edible or food grade ammonium, sodium or potassium salts of organic acids, such as acetic acid, lactic acid or propionic acid, or of inorganic acids, such as hydrochloric, sulfuric or phosphoric acids. The ammoniation of a component of the ink composition may also be used to provide at least part of the conductivity required in the composition. Such an ammoniated component is often readily soluble in the solvent medium but reverts to a water insoluble form due to loss of the ammonia from the printed droplet, whereby the component provides the printed droplet with enhanced water resistant properties.

Other optional components include defoamers, which improve ink manufacturing and printer performance. Suitable defoamers include acetylenic diols (commercially available as Surfynol 104 from Air Products and Chemicals), petroleum blends (commercially available as Napco NDW, Dehydran C, and Foamaster NS, all from Henkel Corp.), silicone-based defoamers (commercially available as Dow Corning 150 from Dow Corning, and Silwet 1-77, Silwet 720, Silwet 722, and Silwet 7002, all available from Union Carbide) and XRM-3588E, Dee Of PI-29, and Dee Of 2020E/50, all available from Ultra Additives. The defoamer, if used, should be present in an amount of from about 0.05% to about 0.10% by weight of the ink composition, with an amount from about 0.03 to about 0.06 being preferred.

It may also be desirable to add a bactericide. Water based inks are susceptible to bacterial attack fouling-up ink manufacturing equipments and printers. Suitable bactericides include methyl parahydroxybenzoate, available as methylparaben from Aldrich Chemicals, and meta-dioxane, available as GivGard DXN from Givudan Corp. The bactericide, if one is used, should be present in an amount from about 0.10% to about 0.20% by weight of the ink composition.

A pH control may also be used in the ink composition to insure that the components of the ink composition remain soluble throughout the range of water and throughout the period of storage and use. The use of a pH control is also desirable to prevent corrosion of the metal components of the ink jet printer. For this purpose, it is desirable to maintain the pH of the ink at about 5.0 to about 10.5. The pH is dependent upon the components which are employed in the composition. Although use can be made of inorganic bases such as sodium hydroxide and potassium hydroxide, their presence in the printed character leads to poor water resistance after drying. It is preferred to make use of an organic base which can be eliminated by evaporation. Best use is made of a pH adjusting agent that evaporates rapidly to accelerate development of water resistance upon aging. Thus, while use can be made of organic amines, it is preferred to make use of ammonium hydroxide or ammonium chloride for controlling pH within the desired range. Morpholine can also be used for long term stability during storage of an ink composition. Triethanolamine can also be used.

Typically, the pH control is present in an amount from about 0.10% to about 2.0% by weight of the ink composition. The optimal amount will vary depending upon the specific components of the ink composition.

The present invention may also comprise other additives, which may be any substance that can enhance the ink with regard to (i) improved solubility of other components, (ii) improved print quality, (iii) improved adhesion of the ink to the media, and (iv) control of wetting characteristics, which may be related to such properties as surface tension and viscosity, among other properties.

MANUFACTURE

The ink compositions of the present invention for the following examples can be made by conventional means. One method is as follows: The carrier should be added into a mixing tank. Then, the humectants, if present, should be added and mixed with the carrier. After the mixing is completed, the dispersant(s) should be added and also mixed thoroughly into the composition. When that mixing step is complete, a pH adjuster should be added into the composition. The resin component should then be added and mixed into the composition until it is completely dissolved. Finally, the pigment should be added, and the composition should be mixed thoroughly. The resulting ink composition should then be filtered.

The following examples are illustrative of ink compositions of the present invention.

| Comparative Example | % By Weight |
| --- | --- |
| Joncryl 50 (S. C. Johnson)[1] | 20.0 |
| N-Methyl-2-Pyrrolidone | 2.0 |
| Ammonium Hydroxide (30%) | 1.5 |
| XRM 3588E defoamer (Ultra Additives) | 0.1 |
| Giv-Gard DXN[2] | 0.2 |
| Synthetic Iron Oxide, red (50-9451)[3] | 20.0 |
| Deionized water | 56.3 |
| | 100.0 |

[1]Joncryl 50 is an acrylic resin solution in water.
[2]Giv-Gard DXN is a bactericide.
[3]Available from RBH Dispersions, Inc.

After formulation the ink was determined to have the following properties.

| | |
| --- | --- |
| Viscosity (cps) | 2.73 |
| Specific Gravity | 1.106 |
| Resistivity (ohm-cm) | 52.0 |
| pH | 9.64 |
| Sedimentation rate[4] | 34.6 mg/hr. |

[4]Measured in all Examples by using the sedimentation rate analysis procedure discussed previously in the specification.

The pigment particles were determined to have the following properties:

| | |
| --- | --- |
| Median Particle Size | 0.335μ |
| 98% Less Than | 1.056μ |

The settling and redispersion problems of the pigment particles in the ink cause shelf life instability, printing difficulties and print density variation.

The following Examples 1–4 illustrate ink jet formulations of the present invention for use in printing onto porous substrates such as ceramic tile. In each of the following examples, the ink was made by the aforementioned general procedure.

| Example 1 | % By Weight |
|---|---|
| Joncryl 50 (S. C. Johnson) | 20.0 |
| N-Methyl-2-Pyrrolidone | 2.0 |
| Ammonium Hydroxide (30%) | 1.5 |
| XRM defoamer 3588E (Ultra Additives) | 0.1 |
| Giv-Gard DXN | 0.2 |
| Synthetic Iron Oxide, Midas Gold (50-9430) | 20.0 |
| Deionized water | 56.2 |
| | 100.0 |

| Properties: | |
|---|---|
| Viscosity (cps) | 3.54 |
| Specific Gravity | 1.065 |
| Resistivity (ohm-cm) | 60.7 |
| Sedimentation | 00.0 (it does not settle) |

The pigment particles were determined to have the following properties:

| Median Particle Size | 0.0236μ |
|---|---|
| 98% Less Than | 0.0398μ |

| Example 2 | % By Weight |
|---|---|
| Polyvinyl Pyrrolidone (PVP) | 4.0 |
| N-Methyl-2-Pyrrolidone | 2.0 |
| Ammonium Hydroxide (30%) | 1.5 |
| XRM 3588E defoamer | 0.1 |
| Giv-Gard DXN | 0.1 |
| Synthetic Iron Oxide, Midas Gold (50-9430) | 20.0 |
| Deionized water | 68.3 |
| | 100.00 |

After formulation the ink was determined to have the following properties:

| Viscosity (cps) | 4.00 |
|---|---|
| pH | 10.44 |
| Resistivity (ohm-cm) | 49.0 |
| Specific Gravity | 1.055 |
| Sedimentation rate | 0.00 |

The pigment particles were determined to have the following properties:

| Median Particle Size | 0.025μ |
|---|---|
| 98% Less Than | 0.034μ |

| Example 3 | % By Weight |
|---|---|
| Nopcospere 44[1] | 10.0 |
| N-Methyl-2-pyrrolidone | 2.0 |
| Ammonium Hydroxide (30%) | 1.5 |
| XRM 2588E defoamer | 0.1 |
| Giv-Gard DXN | 0.1 |
| Synthetic Iron Oxide, Midas Gold (50-9430) | 20.0 |
| Deionized Water | 66.3 |
| | 100.0 |

[1]Nopcosphere 44 is available from Air Products

After formulation the ink was determined to have the following properties:

| Viscosity (cps) | 2.83 |
|---|---|
| pH | 9.80 |
| Resistivity (ohm-cm) | 65.0 |
| Specific Gravity | 1.052 |
| Sedimentation rate | 0.00 |

The pigment particles were determined to have the following properties:

| Median Particle Size | 0.027μ |
|---|---|
| 98% Less Than | 0.047μ |

| Example 4 | % By Weight |
|---|---|
| Dimethyl Hydantoin Formaldehyde Resin | 8.0 |
| Glycerol | 2.0 |
| N-Methyl-2-Pyrrolidone | 2.0 |
| Ammonium Hydroxide (30%) | 1.5 |
| XRM 3588E defoamer | 0.1 |
| Giv-Gard DXN | 0.1 |
| Synthetic Iron Oxide, Midas Gold (50-9430) | 20.0 |
| Deionized Water | 66.3 |
| | 100.0 |

After formulation the ink was determined to have the following properties:

| Viscosity (cps) | 2.15 |
|---|---|
| pH | 8.82 |
| Resistivity (ohm-cm) | 171.0 |
| Specific Gravity | 1.063 |
| Sedimentation rate | 0.00 |

The pigment particles were determined to have the following properties:

| Median Particle Size | 0.027μ |
|---|---|
| 98% Less Than | 0.038μ |

The following Examples 5–7 illustrate ink jet formulations of the present invention for use in printing onto non-porous substrates, such as glass or electric light bulbs.

| Example 5 | % By Weight |
|---|---|
| Glass resin GR 908[1] | 12.0 |
| Midas Gold (40% in n-propyl acetate) | 20.0 |
| Ethanol | 36.2 |
| Methyl Ethyl Ketone | 31.0 |
| Lithium Nitrate | 0.5 |
| FC 430 10% in MEK[2] | 0.3 |
| | 100.0 |

[1]Available from Owens-Illinois
[2]FC 430 is a surface tension controller

After formulation the ink was determined to have the following properties:

| Viscosity (cps) | 1.14 |
|---|---|
| pH | 5.88 |
| Specific Gravity | 0.890 |
| Resistivity (ohm-cm) | 900 |
| Sedimentation rate | 2.5 mg/hr |

The pigment particles were determined to have the following properties:

| Median Particle Size | 0.038μ | |
|---|---|---|
| 98% Less Than | 0.180μ | |
| | Example 6 | Example 7 |
| | % By Weight | % By Weight |
| Glass Resin GR 950[1] | — | 14.0 |
| Silicone Resin G-2230 | 14.0 | — |
| Ethanol | 30.0 | 30.0 |
| Midas Gold | 20.0 | 20.0 |
| Methyl Ethyl Ketone | 35.2 | 35.2 |
| Lithium Nitrate | 0.5 | 0.5 |
| FC 430 | 0.3 | 0.3 |

| | -continued | |
|---|---|---|
| Median Particle Size | | 0.038μ |
| 98% Less Than | | 0.180μ |
| | Example 6 % By Weight | Example 7 % By Weight |
| | 100.0 | 100.0 |

¹Available from Owens-Illinois

After formulation the ink was determined to have the following properties:

| | | |
|---|---|---|
| Viscosity (cps) | 1.40 | 1.42 |
| Specific Gravity | 0.910 | 0.915 |
| Resistivity (ohm-cm) | 1,666 | 1,566 |
| pH | 5.86 | 5.84 |
| Sedimentation Rate (mg/hr) | 2.00 | 0.00 |

The pigment particles were determined to have the following properties:

| | Example 6 | Example 7 |
|---|---|---|
| Median Particle Size | 0.040μ | 0.037μ |
| 98% Less Than | 0.176μ | 0.176μ |

The inks of Examples 1–4 were printed onto ceramic tiles and fired for 15 minutes at 1600° F. temperature and survived without fading. The inks of Examples 5–7 were also printed onto light bulbs (40, 60, 75 and 100 watts).

What is claimed is:

1. An ink composition suitable for ink jet printing operations, comprising a dispersion of synthetic pigment particles that have a particle size from about 0.02 to about 0.20 microns, with at least about 90 percent of said particles having diameters less than about 0.1 micron, a carrier and a binder.

2. The ink composition of claim 1 wherein at least 90 percent of the particle are less than 0.05 micron in size.

3. The ink composition of claim 1 wherein the carrier comprises water.

4. The ink composition of claim 3, further comprising a humectant.

5. The ink composition of claim 4 wherein said pigment is present in an amount from about 3% to about 12% by weight of said ink composition.

6. The ink composition of claim 1 wherein the carrier comprises an organic solvent.

7. The ink composition of claim 6 wherein said pigment is present in an amount from about 3% to about 8% by weight of said ink composition.

8. A method of printing images onto substrates that are to be subsequently subjected to temperatures of at least 500° F., comprising printing onto said substrate, by ink jet printing, the ink composition of claim 1, and subsequently subjecting said substrate to said temperature.

* * * * *

REEXAMINATION CERTIFICATE (3543rd)

United States Patent [19]

Loria et al.

[11] B1 5,443,628

[45] Certificate Issued Jun. 9, 1998

[54] HIGH TEMPERATURE JET PRINTING INK

[75] Inventors: Adrian M. Loria, Wilmette; Lily Tai, Chicago, both of Ill.

[73] Assignee: Videojet Systems International, Inc., Wood Dale, Ill.

Reexamination Request:
No. 90/004,792, Oct. 8, 1997

Reexamination Certificate for:
Patent No.: 5,443,628
Issued: Aug. 22, 1995
Appl. No.: 287,269
Filed: Aug. 8, 1994

[51] Int. Cl.$^6$ .................... C09D 11/02
[52] U.S. Cl. .................... 106/31.65; 347/100
[58] Field of Search .................... 106/31.65; 347/100

[56] References Cited

U.S. PATENT DOCUMENTS 5,258,064  11/1993  Colt .................... 106/31.43
5,310,778  5/1994  Shor et al. .................... 106/31.6

FOREIGN PATENT DOCUMENTS

| | | |
|---|---|---|
| 259130 | 3/1988 | European Pat. Off. |
| 429828 | 6/1991 | European Pat. Off. |
| 526198 | 2/1993 | European Pat. Off. |
| 540757 | 5/1993 | European Pat. Off. |
| 4328215 | 3/1994 | Germany |
| 64-056776 | of 1989 | Japan |

*Primary Examiner*—Helene Klemanski

[57] ABSTRACT

A method and composition for printing images onto substrates that are to be subsequently subjected to temperatures of at least 500° F., comprising printing onto said substrate, by ink jet printing, an ink composition comprising a dispersion of synthetic pigment particles that have a particle size from about 0.02 to about 0.20 microns, with at least about 90 percent of said particles having diameters less than about 0.1 micron, and subsequently subjecting said substrate to said temperature.

REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

Claim 8 is determined to be patentable as amended.

New claims 9–32 are added and determined to be patentable.

8. A method of printing images onto substrates that are to be subsequently subjected to temperatures of at least [500 F.] *500° F.*, comprising printing onto said substrate, by ink jet printing, [the] *an* ink composition [of claim 1.] *comprising a dispersion of synthetic pigment particles that have a particle size of from about 0.02 micron to about 0.20 micron, with at least about 90 percent of said particles having diameters less than about 0.1 micron, a carrier and a binder, and subsequently subjecting said substrate to said temperature.*

*9. The method of claim 8, wherein at least 90 percent of the particles are less than 0.05 micron in size.*

*10. The method of claim 8, wherein the carrier comprises water.*

*11. The method of claim 10, further comprising a humectant.*

*12. The method of claim 11, wherein said pigment is present in an amount of from about 3% to about 12% by weight of said ink composition.*

*13. The method of claim 8, wherein the carrier comprises an organic solvent.*

*14. The method of claim 13, wherein said pigment is present in an amount of from about 3% to about 8% by weight of said ink composition.*

*15. The method of claim 8, wherein said ink composition has (1) a viscosity of from about 1 centipoise to about 10 centipoises at 25° C., (2) an electrical resistivity of from about 40 ohms-cm$^{-1}$ to about 2000 ohms-cm$^{-1}$, (3) a sonic velocity of from about 1200 m/sec to about 1700 m/sec, and (4) a surface tension below 70 dynes/cm.*

*16. The ink composition of claim 1, which has (1) a viscosity of from about 1 centipoise to about 10 centipoises at 25° C., (2) an electrical resistivity of from about 40 ohms-cm$^{-1}$ to about 2000 ohms-cm$^{-1}$, (3) a sonic velocity of from about 1200 m/sec to about 1700 m/sec, and (4) a surface tension below 70 dynes/cm.*

*17. The ink composition of claim 1, wherein said synthetic pigment particles do not degrade when heated to 500° F. or above.*

*18. The ink composition of claim 17, wherein said binder is selected from the group consisting of acrylic copolymers, silicone resins, rosin esters, polyvinyl esters, ketone resins, urea aldehyde resins, vinyl chloride/vinylether or vinyl acetate copolymers, polyamide resins, styrene/maleate resins, vinylpyrrolidone/vinyl acetate copolymers, polystyrene resins, melamine resins, thermosetting acrylic resins, polyurethane resins, and radiation curable acrylate resins.*

*19. The ink composition of claim 18, which has (1) a viscosity of from about 1 centipoise to about 10 centipoises at 25° C., (2) an electrical resistivity of from about 40 ohms-cm$^{-1}$ to about 2000 ohms-cm$^{-1}$, (3) a sonic velocity of from about 1200 m/sec to about 1700 m/sec, and (4) a surface tension below 70 dynes/cm.*

*20. The ink composition of claim 19, wherein at least 90 percent of the particles are less than 0.05 micron in size.*

*21. The ink composition of claim 19, wherein the carrier comprises water.*

*22. The ink composition of claim 21, further comprising a humectant.*

*23. The ink composition of claim 22, wherein said pigment is present in an amount of from about 3% to about 12% by weight of said ink composition.*

*24. The ink composition of claim 19, wherein the carrier comprises an organic solvent.*

*25. The ink composition of claim 24, wherein said pigment is present in an amount of from about 3% to about 8% by weight of said ink composition.*

*26. The ink composition of claim 18, wherein said binder is selected from the group consisting of silicone resins, rosin esters, polyvinyl esters, ketone reins, urea aldehyde resins, vinyl chloride/vinyl ether or vinyl acetate copolymers, polyamide resins, styrene/maleate resins, vinylpyrrolidone/ vinyl acetate copolymers, polystyrene resins, melamine resins, thermosetting acrylic resins, polyurethane resins, and radiation curable acrylate resins.*

*27. The ink composition of claim 26, wherein at least 90 percent of said particles are less than 0.05 micron in size.*

*28. The ink composition of claim 26, wherein said carrier comprises water.*

*29. The ink composition of claim 28, further comprising a humectant.*

*30. The ink composition of claim 29, wherein said pigment is present in an amount of from about 3% to about 12% by weight of said ink composition.*

*31. The ink composition of claim 26, wherein said carrier comprises an organic solvent.*

*32. The ink composition of claim 31, wherein said pigment is present in an amount of from about 3% to about 8% by weight of said ink composition.*

\* \* \* \* \*